(12) United States Patent
Cappetta et al.

(10) Patent No.: US 12,373,475 B1
(45) Date of Patent: Jul. 29, 2025

(54) AUTOMATED GENERATION OF DATA OBJECTS USING SEMANTIC COMPARISONS AND ARTIFICIAL INTELLIGENCE

(71) Applicant: Boomi, LP, Conshohocken, PA (US)

(72) Inventors: Chris Cappetta, Fort Collins, CO (US); Swagata Ashwani, Foster City, CA (US); Prakhar Amlathe, Santa Clara, CA (US); Eric Fennell, Cambridge, MA (US); Michael Bachman, Bala Cynwyd, PA (US)

(73) Assignee: BOOMI, LP, Conshohocken, PA (US)

( * ) Notice: Subject to any disclaimer, the term of this patent is extended or adjusted under 35 U.S.C. 154(b) by 0 days.

(21) Appl. No.: 18/736,215

(22) Filed: Jun. 6, 2024

(51) Int. Cl.
*G06F 7/00* (2006.01)
*G06F 16/3332* (2025.01)
*G06F 16/334* (2025.01)
*G06F 40/30* (2020.01)

(52) U.S. Cl.
CPC ...... *G06F 16/3347* (2019.01); *G06F 16/3334* (2019.01); *G06F 40/30* (2020.01)

(58) Field of Classification Search
CPC ........ G06F 16/35; G06F 16/56; G06F 16/254; G06F 16/86; G06F 16/215; G06F 16/907; G06F 16/2465; G06F 16/3334; G06F 16/9024; G06F 16/3347; G06F 16/3329; G06F 16/3325; G06F 16/90332; G06F 16/3346; G06F 40/30; G06F 40/35; G06F 40/47; G06F 40/205; G06F 40/56; G06F 40/44; G06F 40/289; G06F 40/279; G06F 40/216; G06F 40/295; G06F 40/253
See application file for complete search history.

(56) References Cited

U.S. PATENT DOCUMENTS

| | | | |
|---|---|---|---|
| 8,943,076 B2 | 1/2015 | Stewart et al. | |
| 11,893,060 B2 * | 2/2024 | Grail | G06F 40/56 |
| 12,242,815 B1 * | 3/2025 | Poon | G06F 16/35 |
| 2018/0113888 A1 * | 4/2018 | Peña Muñoz | G06F 16/56 |
| 2022/0147836 A1 * | 5/2022 | Zhao | G06N 3/048 |

\* cited by examiner

*Primary Examiner* — Mohammad A Sana
(74) *Attorney, Agent, or Firm* — Procopio, Cory, Hargreaves & Savitch LLP

(57) ABSTRACT

Currently, technical expertise is required to construct data objects within integration processes. Disclosed embodiments enable automated generation of data objects using semantic comparisons and artificial intelligence. In particular, data may be converted into reference vector embeddings that define a semantic location of the data within a multi-dimensional vector space. User requests may be converted into input vector embeddings. The input vector embeddings may be semantically compared to the reference vector embeddings to identify semantically similar data, and related data may be identified using a graph database. This semantically similar and related data may then be used to generate a prompt, which may be input to a generative language model to automatically produce a data object for use in an integration process.

20 Claims, 6 Drawing Sheets

AUTOMATED GENERATION OF DATA OBJECTS USING SEMANTIC COMPARISONS AND ARTIFICIAL INTELLIGENCE

BACKGROUND

Field of the Invention

The embodiments described herein are generally directed to the generation of data objects, and, more particularly, to automated generation of data objects using semantic comparisons and artificial intelligence.

Description of the Related Art

Integration platform as a service (iPaaS) enables the integration of applications and data. The iPaaS platform provided by Boomi® of Conshohocken, Pennsylvania, enables a user to construct integration processes on a virtual canvas from pre-built steps, represented by "shapes," which each has a set of configuration properties. Each step dictates how an integration process retrieves data, transforms or otherwise manipulates data, routes or maps data, sends data, and/or the like. These steps can be connected together in endless combinations to build anywhere from simple to very complex integration processes.

Recently, there has been a major push to simplify business processes. In particular, it is advantageous when workers can perform daily tasks without requiring special skills or training. This simplifies onboarding and empowers workers to be as efficient and productive as possible.

However, the technical knowledge required to construct integration processes is a barrier to simplifying (e.g., automating) the management of integration platforms. When constructing an integration process, novice users often have to go through multiple iterations of trial and error before achieving a successful implementation. In many cases, the user will have to pore through documentation and/or consult with subject-matter experts or integration experts, in order to design and develop an effective integration process. There is a large learning curve for such users.

While the construction of integration processes has been significantly simplified by companies such as Boomi®, it can still require specific technical expertise to generate certain data objects. While there are existing solutions that automate the generation of data objects within integration platforms, these solutions are based on static, pre-existing definitions or simple merges of such definitions. The present disclosure is directed to overcoming these and other problems found in state-of-the-art solutions.

SUMMARY

Systems, methods, and non-transitory computer-readable media are disclosed for automated generation of data objects using semantic comparisons and artificial intelligence.

In an embodiment, a method comprises using at least one hardware processor to:
for each of a plurality of data items, determine a reference vector embedding for the data item that defines a semantic location of the data item within a vector space, wherein the vector space has a plurality of dimensions, and store the data item in association with the reference vector embedding within a data store; generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes; and for each of one or more user requests for a data object, determine at least one input vector embedding, within the vector space, based on the user request, search the reference vector embeddings in the data store to identify one or more semantically similar reference vector embeddings that are semantically similar to the at least one input vector embedding based on a similarity metric, search the graph database to identify one or more related reference vector embeddings that are related to the identified one or more semantically similar reference vector embeddings based on one or more edges within the graph database, retrieve at least a subset of the plurality of data items associated with the identified one or more semantically similar reference vector embeddings and the identified one or more related reference vector embeddings, generate a prompt based on the at least a subset of data items, input the prompt to a generative language model to generate the data object, and output the data object. The generative language module may be a large language model.

At least one of the one or more user requests may identify the data object to be generated. The at least one user request may include a context of the data object.

The plurality of data items may comprise a plurality of reference data objects.

Searching the graph database may comprise: identifying a first one of the plurality of nodes that includes at least one of the identified one or more semantically similar reference vector embeddings; identifying at least one second one of the plurality of nodes that is connected to the first node by at least one edge; and including at least one of the reference vector embeddings, in the cluster represented by the at least one second node, in the identified one or more related reference vector embeddings. The relationship, represented by the at least one edge, may be a trait that is shared by the first node and the at least one second node. The trait may be a use case. The trait may be a data vertical.

The at least one second node may be a plurality of second nodes, and identifying at least one second one of the plurality of nodes that is connected to the first node by at least one edge may comprise, when more than a predefined number of the plurality of nodes are connected to the first node by at least one edge: ranking the plurality of nodes that are connected to the first node by at least one edge, according to one or more factors; and selecting the plurality of second nodes to be the predefined number of the ranked plurality of nodes that are highest ranked. The one or more factors may comprise a number of edges. The one or more factors may comprise a type of relationship represented by the at least one edge connecting the ranked plurality of nodes to the first node. The one or more factors may comprise a number of edges, and a type of relationship represented by the at least one edge connecting the ranked plurality of nodes to the first node. The one or more factors may comprise a number of each type of relationship represented by the at least one edge connecting the ranked plurality of nodes to the first node.

The data object may represent a data structure for a record in a master data hub.

Outputting the data object may comprise displaying a visual representation of the data object on a virtual canvas within a graphical user interface.

The method may further comprise using the at least one hardware processor to, for each of the one or more user requests, incorporate the data object into an integration process. The method may further comprise using the at least one hardware processor to, for each of the one or more user requests, deploy the integration process to perform data integration in real time within an integration environment.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for automated generation of data objects using semantic comparisons and artificial intelligence. This automated generation of data objects may be performed dynamically as the need for a data object arises. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
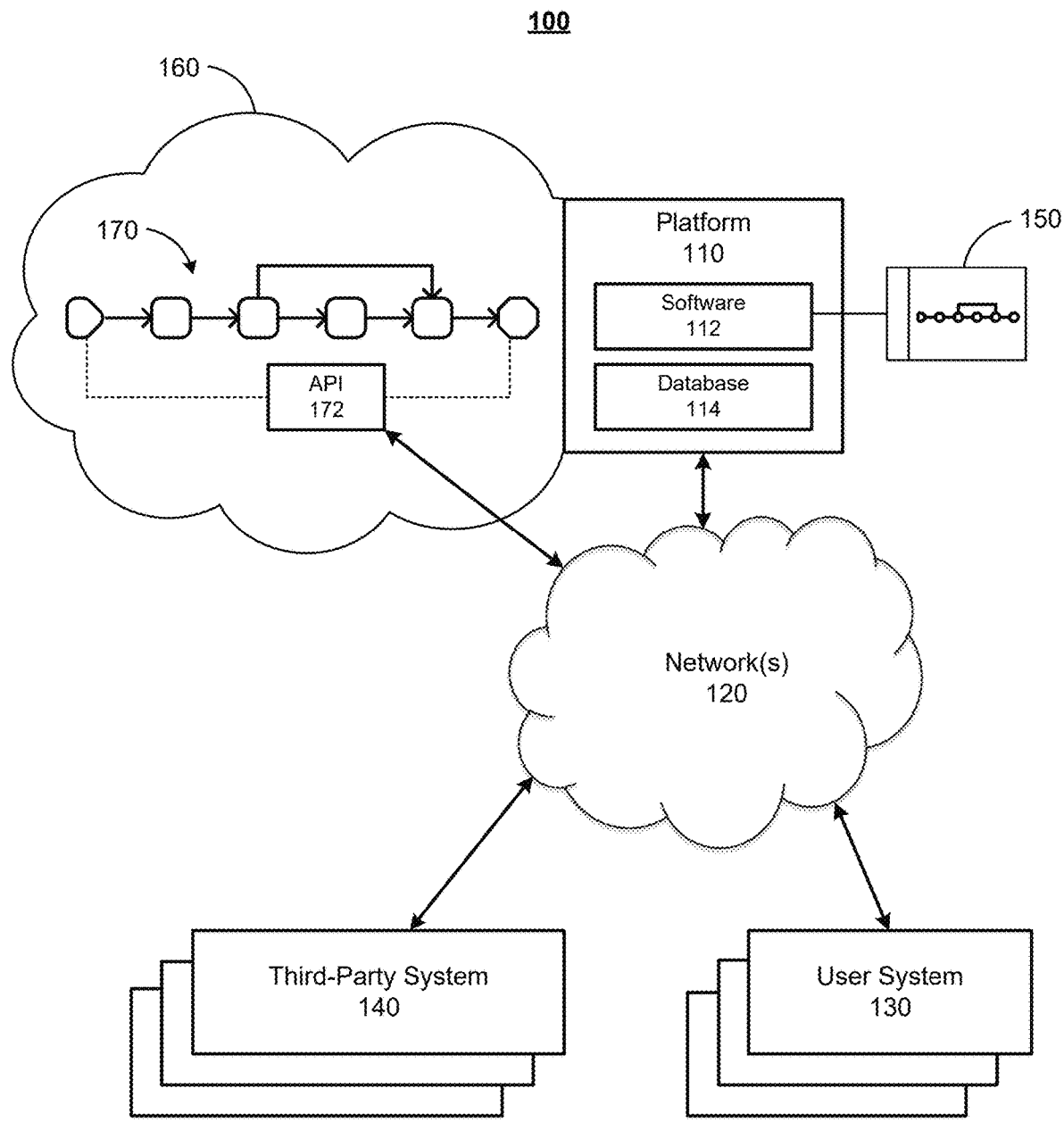
FIG. 1 illustrates an example infrastructure in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may execute software 112, which may include a server application that comprises one or more software modules implementing one or more of the disclosed processes. Platform 110 may also manage one or more databases 114, which may store data used by software 112.

Platform 110 may be communicatively connected to one or more networks 120. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems, including user system(s) 130 and/or third-party system(s) 140, through a single set of network(s) 120, it should be understood that platform 110 may be connected to the various systems via different sets of one or more networks 120. For example, platform 110 may be connected to a subset of systems via the Internet, but may be connected to another subset of systems via an intranet.

As mentioned above, platform 110 may be communicatively connected to one or more user systems 130 via network(s) 120. While only a few user systems 130 are illustrated, it should be understood that platform 110 may be communicatively connected to any number of user systems 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer, data engineer, or other user that has a user account for accessing various functionality of software 112 on platform 110.

Software 112 may manage an integration environment 160. In particular, software 112 may provide a graphical user interface 150 and backend functionality, including one or more of the processes disclosed herein, to enable users, via user systems 130, to construct, develop, modify, save, delete, test, deploy, undeploy, and/or otherwise manage integration processes 170 within integration environment 160. Of particular relevance to the present disclosure, the backend functionality of software 112 may include a process for automatically generating a data object to be used within an integration process 170.

Although only a single integration process 170 is illustrated, it should be understood that, in reality, integration environment 160 may comprise any number of integration processes 170. In an embodiment, integration environment 160 supports iPaaS. In this case, integration environment 160 may comprise one or a plurality of integration platforms that each comprises one or more integration processes 170. Each integration platform may be associated with an organization, which may be associated with one or more user accounts by which respective user(s) manage the organization's integration platform, including the various integration process(es) 170. In a preferred embodiment, integration environment 160 is implemented in a computing cloud, such that integration platforms and/or individual integration processes 170 may be "spun up" and "spun down" based on real-time demand.

An integration process 170 may represent a transaction involving the integration of data between two or more systems, and may comprise a series of elements that specify logic and transformation requirements for the data to be integrated. Each element, which may also be referred to herein as a "step" and represented as a "shape" within graphical user interface 150, and which is one example of a data object, may retrieve or otherwise receive, transform or otherwise manipulate, route or map, and/or send data. For example, a basic integration process 170 may receive data from one or more data sources (e.g., via an application programming interface 172 of the integration process 170), manipulate the received data in a specified manner (e.g., including analyzing, normalizing, mapping, altering, updating, enhancing, and/or augmenting the received data), and send the manipulated data to one or more specified data targets. The receiving step may be performed by a connector that interfaces with the data source, and the sending step may be performed by a connector that interfaces with the data target.

An integration process 170 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

The user of a user system 130 may authenticate with platform 110 using standard authentication means, to access software 112 in accordance with permissions or roles of the associated user account. The user may then interact with software 112 to construct, develop, modify, save, delete, test, deploy, undeploy, and/or otherwise manage one or more integration processes 170, for example, within a larger integration platform within integration environment 160. It should be understood that multiple users, on multiple user systems 130, may manage the same integration process(es) 170 and/or different integration processes 170 in this manner, according to the permissions or roles of their associated user accounts.

Each integration process 170, when deployed, may be communicatively coupled to network(s) 120. For example, each integration process 170 may comprise an application programming interface (API) 172 that enables clients to access integration process 170 via network(s) 120. A client may push data to integration process 170 through application programming interface 172 and/or pull data from integration process 170 through application programming interface 172.

One or more third-party systems 140 may be communicatively connected to network(s) 120, such that each third-party system 140 may communicate with an integration process 170 in integration environment 160 via application programming interface 172. Third-party system 140 may host and/or execute a software application that pushes data to integration process 170 and/or pulls data from integration process 170, via application programming interface 172. Additionally or alternatively, an integration process 170 may push data to a software application on third-party system 140 and/or pull data from a software application on third-party system 140, via an application programming interface of the third-party system 140. Thus, third-party system 140 may be a client or consumer of one or more integration processes 170, a data source for one or more integration processes 170, a data target for one or more integration processes 170, and/or the like. As examples, the software application on third-party system 140 may comprise, without limitation, enterprise resource planning (ERP) software, customer relationship management (CRM) software, accounting software, and/or the like.

2. Example Data Flow

Figure 2:
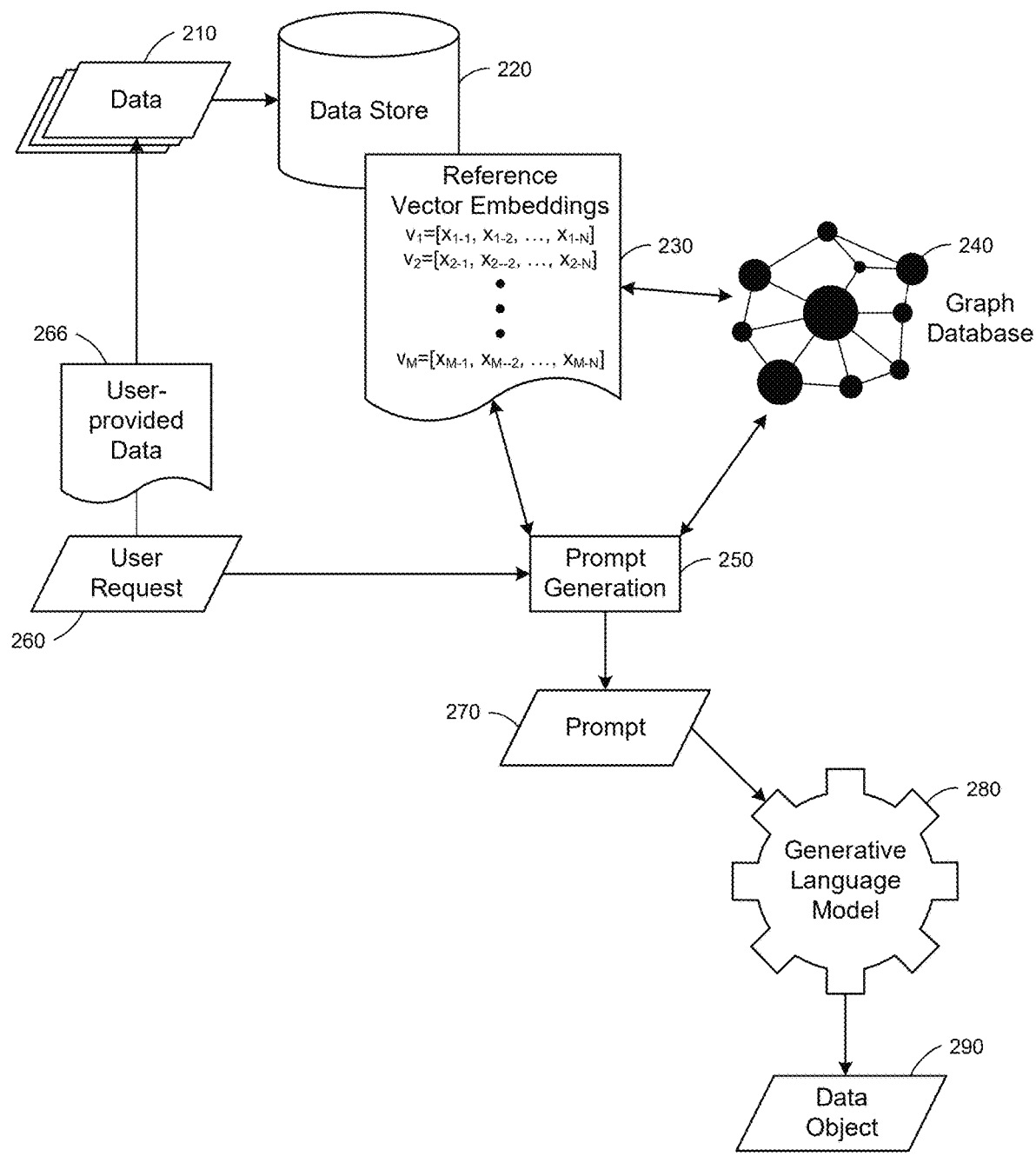
FIG. 2 illustrates an example data model for automated generation of data objects using semantic comparisons and artificial intelligence, according to an embodiment.

FIG. 2 illustrates an example data model 200 for automated dynamic generation of data objects using semantic comparisons and artificial intelligence, according to an embodiment. Initially, data 210 are acquired from one or more data sources. Data 210 may comprise one or more, and generally a plurality of, data items. Each data item in data 210 may be stored in a data store 220, which may be comprised in database 114 on platform 110.

In an embodiment, data 210 are collected from a plurality of data sources. At least a first subset of data 210 may be acquired from used-provided data 266, which may be provided with a user request 260. It should be understood that user-provided data 266 may be specifically related to user request 260 and provided (e.g., uploaded, selected, or otherwise indicated from user system 130) by the user submitting user request 260 via graphical user interface 150. At least a second subset of data 210 may be acquired from other data sources, such as integration processes 170 of a plurality of different customer's integration platforms within integration environment 160, one or more third-party systems 140, and/or the like. It should be understood that this second subset of data 210 may not be specific to any particular user request 260, but may instead represent common (e.g., crowd-sourced, scraped, etc.) data that may or may not be relevant to any particular user request 260. Data 210 may comprise or consist of the first subset of data 210, comprise or consist of the second subset of data 210, or comprise or consist of both the first subset and the second subset of data 210.

Whether user-provided or acquired from other data sources, data 210 may comprise different types of data. For example, data 210 may comprise one or more files including definitions (e.g., designs, data structures, templates, etc.) for various data objects, path information (e.g., path definitions), documentation (e.g., from one or more document libraries), and/or the like, that are internal to one or more integration platforms within integration environment 160 (e.g., crowd-sourced from integration platforms of a plurality of different customers). As another example, data 210 may comprise websites or other external data comprising definitions for various data objects, path information, documentation, and/or the like, that are external to integration environment 160 (e.g., scraped from third-party system(s) 140). As yet another example, data 210 may comprise software definitions (e.g., source code), function descriptions, scripts, API definitions, and/or the like. It should be understood that these are simply a few non-limiting examples, and that data 210 may comprise alternative or additional data that may be relevant (e.g., provide context) to data objects being managed through platform 110. In an embodiment, data 210 at least comprise a plurality of reference data objects, representing existing data objects that, for example, have been and/or are being used in a plurality of integration platforms, potentially managed by a plurality of different organizations, within integration environment 160.

Reference vector embeddings 230 may be determined for data 210 in data store 220. In particular, a reference vector embedding 230 may be determined for each of the plurality of data items stored in data store 220. Each data item may be stored in association with the reference vector embedding 230, that was determined for that data item, within data store 220. For each data item, the reference vector embedding 230 for the data item may define a semantic location of the data item within a vector space. The vector space has a plurality of dimensions, and each reference vector embedding 230 may define the semantic location of the data item within each of the plurality of dimensions. For example, a reference vector embedding 230 may comprise a vector having a length that is equal to the number of dimensions in the vector space, with each value (e.g., a floating-point number) in the vector representing a semantic location of the respective data item in a different one of the plurality of dimensions, and the entire vector representing the semantic location of the respective data item in all of the plurality of dimensions of the vector space. The number of dimensions in the vector space may be any number, including two, three, four, five, ten, twenty, fifty, one hundred, several hundred, one thousand, several thousand, tens of thousands, hundreds of thousands, a million, several million, tens of millions, hundreds of millions, a billion, several billion, tens of billions, hundreds of billions, or more. It should be understood that the closer the location of a first reference vector embedding 230, representing a first data item, is to the location of a second reference vector embedding 230, representing a second data item, within the vector space, the more semantically similar the first data item is to the second data item. Conversely, the farther the location of the first reference vector embedding 230 is from the location of the second reference vector embedding 230, within the vector space, the less semantically similar the first data item is to the second data item.

In an embodiment, a graph database 240 may be generated from reference vector embeddings 230. Graph database 240 may comprise a plurality of nodes and a plurality of edges. Each of the plurality of nodes may represent a cluster of reference vector embeddings 230 for a subset of the plurality of data items in data store 220. Any suitable clustering algorithm may be used to cluster reference vector embeddings 230 into the plurality of nodes. Examples of clustering algorithms include, without limitation, the k-Means algorithm, Density-Based Spatial Clustering of Applications with Noise (DBSCAN) algorithm, Gaussian Mixture Model algorithm, Balance Iterative Reducing and Clustering using Hierarchies (BIRCH) algorithm, Affinity Propagation algorithm, Mean-Shift algorithm, Ordering Points to Identify the Clustering Structure (OPTICS) algorithm, Agglomerative Hierarchy algorithm, Divisive Hierarchical algorithm, Spectral Clustering algorithm, and the like. It should be understood that, regardless of the particular clustering algorithm that is utilized, each node may represent a group of reference vector embeddings 230 that are semantically similar to each other.

In an alternative embodiment, instead of reference vector embeddings 230 being clustered, the data items may be directly clustered into the nodes or other identifiers of the data items may be clustered into the nodes, within graph database 240. It should be understood that, in this case, it is straightforward to associate the data items or identifiers of the data items to reference vector embeddings 230 for the purposes of mapping between reference vector embeddings 230 and the nodes of graph database 240.

Each of the plurality of edges may represent a relationship between a connected pair of the plurality of nodes in graph database 240. A first one of the plurality of nodes may be connected to a second one of the plurality of nodes by zero edges (i.e., not directly connected), one edge, or two or more edges. Different ones of the plurality of edges may represent different types of relationships. For example, in the event that the first node is connected to the second node by two or more nodes, the two or more edges represent that the first node and second node are related by two or more different types of relationships. Examples of the types of relationships include, without limitation, a shared use case (i.e., the data items represented by the vector embeddings 230 in the first and second nodes were involved in the same use case), a shared data vertical (i.e., the data items represented by the vector embeddings 230 in the first and second nodes exist in the same data vertical), and any other shareable trait.

Prompt generation module 250 may be configured to receive a user request 260, and generate a prompt 270 based on user request 260. User request 260 may be a natural-language expression, written by a user, and may at least identify, specify, imply, or otherwise indicate the data object to be generated. User request 260 may also include a context of the data object (e.g., a use case, application, etc. for the data object). The data object may be a data structure representing any entity, including, for example, a step (e.g., connector, data map, transformation, etc.) in an integration process 170, a data source, a data target, a data schema, a contract (e.g., API contract, commercial contract, etc.) between parties, a document, source code (e.g., representing a function definition, software module, software application, script, etc.), a template, an API definition, or the like. As mentioned elsewhere herein, user request 260 may also comprise user-provided data 266, from which at least a subset of data 210 may be derived. However, this is not a requirement.

Prompt generation module 250 may determine one or more input vector embeddings from user request 260. It should be understood that these input vector embedding(s) represent the semantic location(s) of one or more elements of user request 260 within the same vector space as reference vector embeddings 230. Thus, the input vector embeddings may be determined in an identical or similar manner as reference vector embeddings 230 are determined.

Prompt generation module 250 may have access to data store 220, including reference vector embeddings 230, and/or graph database 240. Thus, prompt generation module 250 may utilize the input vector embedding(s) to search reference vector embeddings 230 in data store 220 and/or graph database 240 to identify one or more reference vector embeddings 230 that are similar to the one or more input vector embeddings, for example, based on any suitable similarity metric. In the event that prompt generation module 250 determines a plurality of input vector embeddings from a user request 260, a separate search may be performed for each input vector embedding.

In an embodiment in which prompt generation module 250 searches reference vector embeddings 230 directly, any suitable search algorithm may be used. This search may be referred to herein as a "semantic search." Examples of search algorithms include, without limitation, the k-Nearest-Neighbor (kNN) algorithm, Approximate Nearest Neighbor (ANN) algorithm, and the like. These algorithms may utilize any suitable similarity metric to identify semantically similar ones of vector embedding(s) 230. One well-known example of a similarity metric is the Euclidean distance between two vector embeddings. In the event that there were a plurality of input vector embeddings determined for a user request 260, reference vector embeddings 230 may be searched to identify a set of vector embedding(s) 230 for each individual input vector embedding.

In an embodiment in which prompt generation module 250 searches graph database 240, any suitable search algorithm may be used. This search may be referred to herein as "relationship retrieval." Examples of search algorithms include, without limitation, the k-Nearest-Neighbor (kNN) algorithm, Approximate Nearest Neighbor (ANN) algorithm, and the like, as well as any algorithm that is capable of classifying the input vector embedding(s) into one of the plurality of nodes within graph database 240. Essentially, the search algorithm identifies the closest node, within graph database 240, to the input vector embedding(s) (i.e., the node with the least distance from the input vector embedding(s)). The distance between an input vector embedding and a node may be calculated as a maximum distance between the input vector embedding and the reference vector embeddings 230 within the node, a minimum distance between the input vector embedding and the reference vector embeddings 230 within the node, an average distance between the input vector embedding and the reference vector embeddings 230 within the node, a distance between the input vector embedding and the center of mass of the node, or the like. In the event that there were a plurality of input vector embeddings determined for a user request 260, graph database 240 may be searched to identify a closest node for each individual input vector embedding. Advantageously, the use of graph database 240 reduces the computational expense of searching vector embeddings 230, in terms of the number of semantic comparisons and the overall computational time, since only a subset of vector embeddings 230 needs to be searched. In other words, graph database 240 speeds up the search of vector embeddings 230.

For each input vector embedding that has been matched to a node in graph database 240, all or a subset (e.g., a k-nearest subset to the input vector embedding) of the vector embedding(s) 230 within the matched node may be returned in the search results. In an embodiment, all or a subset of reference vector embeddings 230 within one or more other nodes, which are related to the matched node, may also be returned in the search results. In this case, relatedness may be defined as the number of edges (e.g., representing shared traits or other relationships) directly connecting the matched node and another node. In an embodiment, a pair of nodes with more edges between them (e.g., representing more shared traits or other relationships) are more related than a pair of nodes with fewer edges between them. Each of the nodes directly connected to the matched node may be ranked according to the number of edges and/or the priority of edges between that node and the matched node. Then, a predefined number (e.g., top two, top three, top four, top five, top ten, etc.) of the top ranked nodes may be returned in the search results. The ability to identify nodes that are related to the matched node in graph database 240 enables prompt generation module 250 to find a wide variety of semantically similar data items (e.g., accounts, clients, customers, etc.) that may provide context or otherwise be relevant to generating the data object.

Any suitable architecture may be used for graph database 240. One specific example of an architecture for graph database 240 is the Neo4J™ graph database management system, developed by Neo4j, Inc. of San Mateo, California. Other examples of architectures of graph database 240 include, without limitation, Amazon Neptune™ offered by Amazon Web Services, Inc. of Seattle, Washington, ArangoDB developed by ArangoDB GmBH of San Francisco, California, OrientDB developed by OrientDB Ltd of London, United Kingdom, and the like.

In an embodiment, prompt generation module 250 may search both reference vector embeddings 230 and graph database 240 to identify semantically similar reference vector embeddings 230. In this case, the two sets of search results may be combined, such that any redundant reference vector embeddings 230 are eliminated, to produce a final set of reference vector embeddings 230 that are semantically similar to the input vector embedding(s). In a particular implementation, prompt generation module 250 searches reference vector embeddings 230 to identify a set of one or more closest reference vector embeddings 230 to the input vector embedding(s), identifies the node(s) in graph database 240 in which those closest reference vector embeddings 230 resides, and then identifies additional reference vector embeddings 230 within the identified node or within nodes connected by one or more edges to the identified node (e.g., based on the number and/or type of relationships represented by the edge(s)). In an alternative embodiment, prompt generation module 250 searches only graph database 240 to identify semantically similar reference vector embeddings 230. In this case, graph database 240 may act as an index into reference vector embeddings 230. In yet another alternative embodiment, graph database 240 is omitted, such that prompt generation module 250 only searches vector embeddings 230.

In the event that there are a plurality of input vector embeddings for a user request 260, prompt generation module 250 may perform a discrete search of reference vector embeddings 230 and/or graph database 240 for each input vector embedding. In this case, the search results may comprise a discrete set of semantically similar reference vector embeddings 230 for each input vector embedding.

When the search of reference vector embeddings 230 and/or graph database 240 identifies one or more reference vector embeddings 230, prompt generation module 250 may retrieve the subset of the plurality of data items, within data store 220, that are associated with the identified vector embedding(s) 230. Prompt generation module 250 may then generate prompt 270 based on the retrieved subset of data items and user request 260. Prompt generation module 250 may generate prompt 270 by incorporating (e.g., inserting) data derived from one or more, and potentially all, of the data items in the retrieved subset of data items, as well as data derived from user request 260, into a template. As an example, the incorporated data may comprise one or more raw data items, one or more processed (e.g., formatted) data items, data extracted from one or more data items, and/or the like.

The template, used by prompt generation module 250 to generate prompt 270, may be a predefined template comprising a pre-conversation and/or post-conversation, which provide context and/or instructions for a generative language model 280, as well as one or more placeholders into which the data to be incorporated may be inserted. The pre-conversation and/or post-conversation may define the role of generative language model 280 (e.g., to generate a data object), define an output format for the output (e.g., a markup-language structure, such as extensible Markup Language (XML), or other hierarchical data structure defining the data object), and/or the like. The pre-conversation and/or post-conversation may be static and stored (e.g., in database 114) for retrieval by prompt generation module 250. In this case, different pre-conversations and/or different post-conversations may be associated with different types of user requests 260, and prompt generation module 250 may select one of a plurality of available pre-conversations and/or one of a plurality of available post-conversations based on the type of user request 260 for which prompt 270 is being generated. In an alternative embodiment, the pre-conversation and/or post-conversation may be dynamically generated. In this case, prompt generation module 250 may extract information from or about user request 260, and use this information as input to generative language model 280, or another language model or other software module, to generate one or both of the pre-conversation and post-conversation for prompt 270 or the overall prompt 270.

In summary, prompt generation module 250 generates prompt 270 based on a retrieved subset of the plurality of data items in data store 220 that were associated with vector embedding(s) 230 returned in the result of a semantic search of reference vector embeddings 230 and/or relationship retrieval from graph database 240, as well as potentially based on user request 260. Once prompt 270 has been generated, prompt generation module 250 may input prompt 270 to generative language model 280 to generate the data object requested by the respective user request 260. In particular, prompt 270 may instruct generative language model 280 to generate a data object 290, based on the retrieved subset of data items, as incorporated into prompt 270, and according to a prescribed output format defined in prompt 270. Responsively, generative language model 290 may output data object 290.

Generative language model 280 may be any suitable generative language model. For example, generative language model 280 may comprise or consist of a large language model. One well-known example of a large language model is the Generative Pre-trained Transformer (GPT). GPT-4 is the fourth-generation language prediction model in the GPT-n series, created by OpenAI™ of San Francisco, California. GPT-4 is an autoregressive language model that uses deep learning to produce human-like text. GPT-4 has been pre-trained on a vast amount of text from the open Internet. While GPT-4 is provided as an example, it should be understood that generative language model 280 may be any model capable of processing natural language, including past and future generations of GPT, as well as other large language models. Examples of other suitable large language models include, without limitation, the Claude family of large language models (e.g., Claude 3 Opus) developed by Anthropic PBC of San Francisco, California, the Falcon large language model (e.g., Falcon 180B) released by the United Arab Emirates' Technology Innovation Institute (TII), the Large Language Model Meta AI (LLaMA) model (e.g., LLaMA 2) released by Meta AI of New York, New York, or the like. In an embodiment, a pre-trained generative language model, such as GPT-4 or any other mentioned or unmentioned large language model, is used as a base model that is fine-tuned for generating data objects 290 to produce generative language model 280. The particular generative language model 280 that is selected may dictate how reference vector embeddings 230 and input vector embeddings are generated. In other words, the embedding algorithm used to determine reference vector embeddings 230 and input vector embeddings may be the same embedding algorithm used by generative language model 280.

Data object 290 may comprise a representation of an entity in a standard machine-readable format, such as a hierarchical markup language, a list of key-value pairs, or the like. Regardless of how the entity is represented, data object 290 may define the entity using key-value pairs. Each key-value pair may comprise an identifier of a parameter, as the key, and a value of that parameter according to any suitable data type (e.g., string, character, integer, floating-point, array, etc.). It should be understood that the collection of one or more key-value pairs, which may be arranged in a flat, non-hierarchical structure or a hierarchical structure, represents the definition of data object 290. In other words, data object 290 may be defined by a set of one or more key-value pairs.

Data object 290 may represent a suggestion to the user, who submitted user request 260, for representing an entity in data. Alternatively, data object 290 may be automatically incorporated into an overarching process and/or deployed to another destination. In an embodiment that utilizes data object 290 within integration environment 160, data object 290 may be automatically (i.e., without user intervention), semi-automatically (e.g., with user modification and/or approval), or manually (i.e., by the user) incorporated into an integration process 170. In particular, the data object 290, produced by data model 200 for a user request 260, may be incorporated into the respective integration process 170 at a position, identified in the user request 260, within the respective integration process 170.

For example, a visual representation of data object 290 may be displayed within graphical user interface 150. In an embodiment that utilizes data object 290 within integration environment 160, the visual representation of data object 290 may comprise a shape on the virtual canvas of graphical user interface 150. The shape may be selectable. When the user selects the shape, graphical user interface 150 may provide a dialog which enables the user to view and/or modify the parameters of data object 290 and/or otherwise configure data object 290. Graphical user interface 150 may also provide inputs for deleting the shape, moving the shape (e.g., dragging and dropping the shape to another position on the virtual canvas), and/or the like. It should be understood that actions performed by the user on the shape result in the same actions being performed on the underlying data object 290 itself.

3. Example Process for Constructing Model

Figure 3:
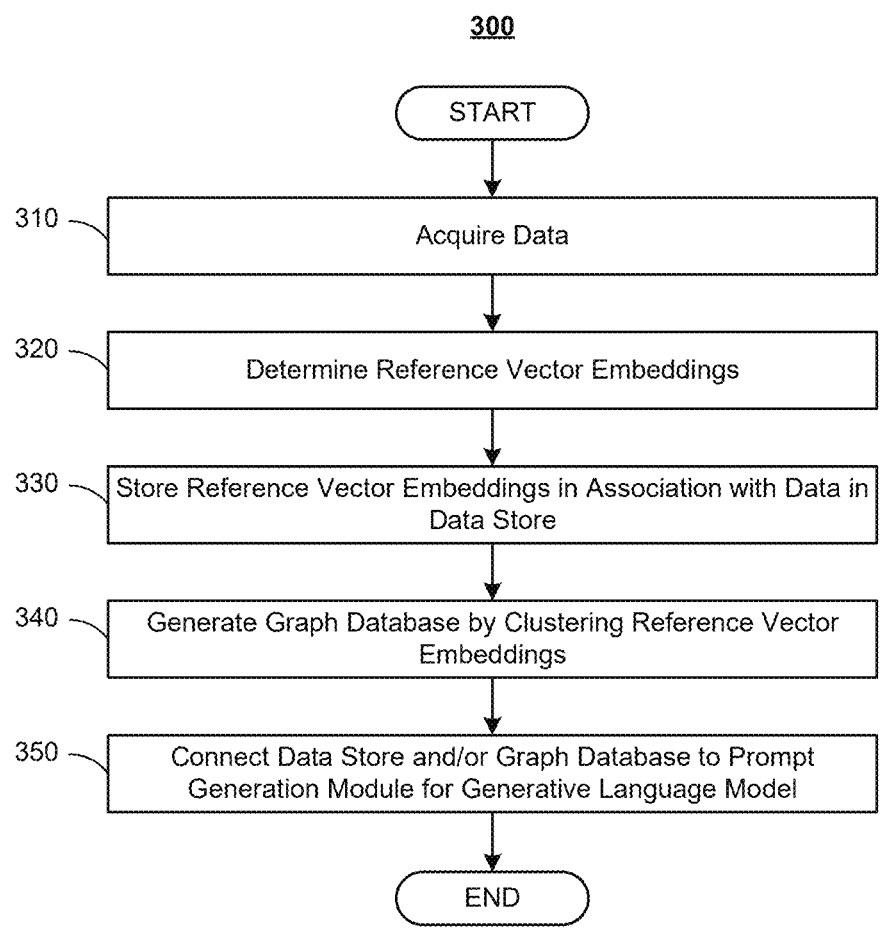
FIG. 3 illustrates an example process for constructing a data model that provides automated generation of data objects using semantic comparisons and artificial intelligence, according to an embodiment.

FIG. 3 illustrates an example process 300 for constructing data model 200 to provide automated generation of data objects 290 using semantic comparisons and artificial intelligence, according to an embodiment. Process 300 may be implemented by software 112. Data model 200 may comprise data store 220, reference vector embeddings 230, graph database 240, prompt generation module 250, and/or generative language model 280.

While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 310, data 210 may be acquired from one or more local and/or global data sources, such as integration environment 160, graphical user interface 150, other components of platform 110, one or more user systems 130 (e.g., user-provided data 266 from one or more users), one or more third-systems 140, and/or the like. Data 210 may comprise a plurality of data items. Examples of a data item include, without limitation, a data-object definition (e.g., as a reference data object), path information, documentation, source code, a function description, a script, an API definition, or the like. It should be understood that the plurality of data items may comprise a combination of any of these and/or other types of data items, and may include tens, hundreds, thousands, millions, billions, trillions, or more distinct data items. In addition, it should be understood that data 210 may comprise structured data, semi-structured data, and/or unstructured data.

In subprocess 320, a reference vector embedding 230 is determined for each of the plurality of data items in data 210. Each reference vector embedding 230 defines a semantic location of the data item within a vector space that has a plurality of dimensions, as discussed elsewhere herein. Reference vector embeddings 230 may be generated from the data items using any suitable embedding algorithm, including potentially a machine-learning algorithm. Examples of embedding algorithms that may be used to generate reference vector embeddings 230 include, without limitation, Word2Vec, Global Vectors for Word Representation (GloVe), Term Frequency and Inverse Document Frequency (TF-IDF), Bidirectional Encoder Representations from Transformers (BERT), Doc2Vec, Skip-Thought vector embedding, the Probabilistic Latent Semantic Indexing (PLSI) model, Latent Dirichlet Allocation (LDA), or the like. More generally, any algorithm for embedding words, sentences, and/or documents into a vector space may be used.

In subprocess 330, reference vector embeddings 230, as determined in subprocess 320, are stored in association with data 210 in data store 220. In particular, for each of the plurality of data items in data 210, the data item may be stored in association with the respective reference vector embedding 230, determined for that data item in subprocess 320, within data store 220. Thus, data store 220 will comprise a plurality of data items and a corresponding plurality of reference vector embeddings 230. In an embodiment, data store 220 is indexed by reference vector embeddings 230, such that any data item may be retrieved by its respective reference vector embedding 230.

In subprocess 340, a graph database 240 may be generated by clustering reference vector embeddings 230 into a plurality of nodes. As discussed elsewhere herein, any suitable clustering algorithm may be used to group semantically similar reference vector embeddings 230 into clusters. The resulting graph database 240 may comprise a plurality of nodes and a plurality of edges. Each of the plurality of nodes may represent a cluster of reference vector embeddings 230 for a subset of the plurality of data items in data store 220, and each of the plurality of edges may represent a relationship between a connected pair of the plurality of nodes. In an embodiment that does not utilize graph database 240, subprocess 340 may be omitted.

In subprocess 350, data store 220 and/or graph database 240 may be connected to prompt generation module 250 for generative language model 280. In particular, prompt generation module 250 may be provided with access to data store 220, and, in an embodiment that comprises graph database 240, access to graph database 240 as well. Access to data store 220 may be provided via an API of data store 220 or in any other suitable manner. Similarly, access to graph database 240 may be provided via an API of graph database 240 or in any other suitable manner. In an alternative embodiment, data store 220 and/or graph database 240 may be connected to prompt generation module 250 by incorporating data store 220 and/or graph database 240 into prompt generation module 250.

By virtue of this connection, prompt generation module 250 is capable of searching data store 220 and/or graph database 240 for reference vector embeddings 230. In an embodiment that does not comprise graph database 240, prompt generation module 250 may be configured to perform a semantic search to directly search reference vector embeddings 230 in data store 220. In an embodiment that does comprise graph database 240, prompt generation module 250 may be configured to directly search both data store 220 and graph database 240. Alternatively, prompt generation module 250 may be configured to only directly search graph database 240, and then use the reference vector embeddings 230, identified in that search, as indices into data store 220.

4. Example Process for Operating Model

Figure 4:
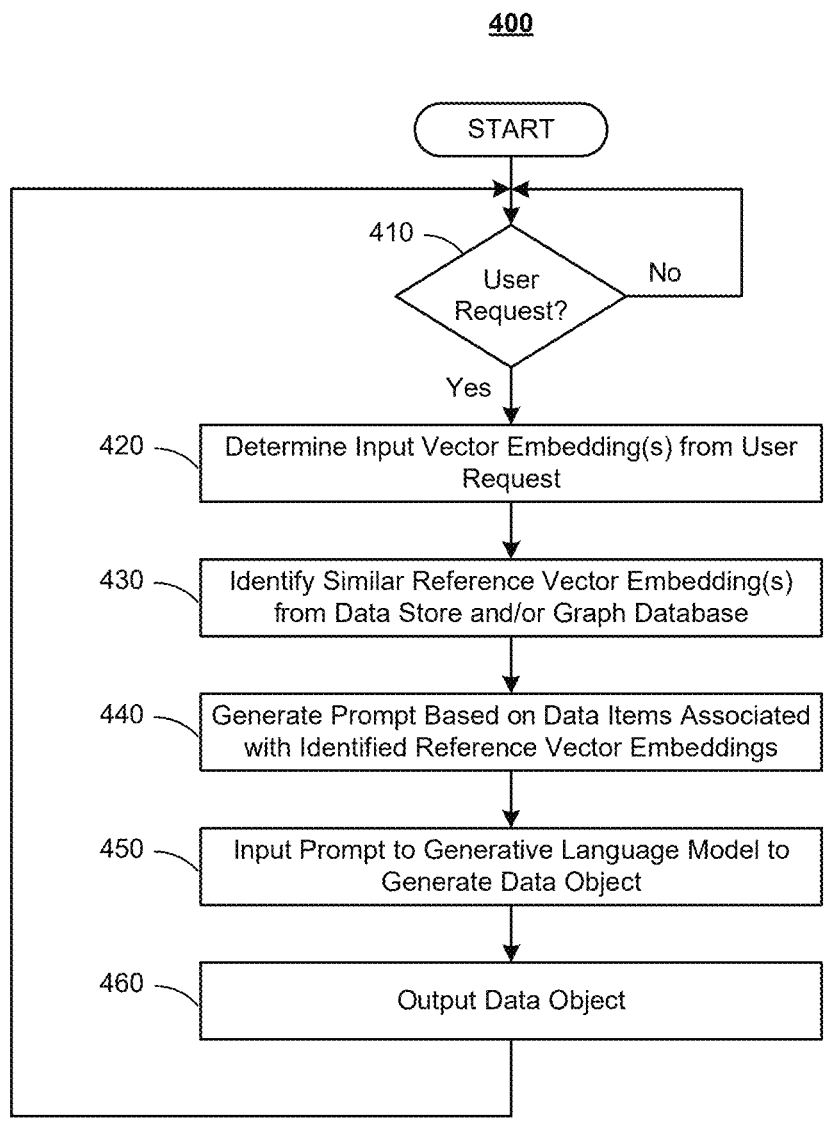
FIG. 4 illustrates an example process for performing automated generation of data objects using semantic comparisons and artificial intelligence, according to an embodiment.

FIG. 4 illustrates an example process 400 for performing automated dynamic generation of data objects 290 using semantic comparisons and artificial intelligence, according to an embodiment. Process 400 may be implemented by software 112. It should be understood that process 400 utilizes data model 200 constructed by process 300. In particular, users may utilize data model 200 to automatically generate data objects 290, for example, while constructing integration processes 170 within integration environment 160 via graphical user interface 150.

While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 400 may be made available to users of platform 110. For example, process 400 may be implemented as a service, in software 112, that is available to developers of integration processes 170 within integration environment 160. For instance, users may have access to process 400, via graphical user interface 150, as a tool to aid in the construction of an integration process 170, for example, on a virtual canvas within graphical user interface 150. An example of such a virtual canvas is described in U.S. Pat. No. 8,533,661, issued on Sep. 10, 2013, which is hereby incorporated herein by reference as if set forth in full. Users may utilize process 400 to automatically generate data objects 290, for incorporation into their respective integration processes 170, based on user requests 260.

In subprocess 410, process 400 waits for a user request 260 for a data object 290 to be received. When a user request 260 is received (i.e., "Yes" in subprocess 410), process 400 proceeds to subprocess 420. Otherwise, while no user request 260 is received (i.e., "No" in subprocess 410), process 400 continues to wait for a user request 260. It should be understood that the remainder of process 400 (i.e., subprocess 420-490) may be performed for each of one or more user requests 260 for a data object 290 that are received.

A user request 260 may be received in any suitable manner. For example, access to process 400 may be provided via an input within graphical user interface 150. In particular, a user may utilize a virtual canvas, within graphical user interface 150, to drag and drop and configure shapes, representing steps, into an integration process 170. The virtual canvas may comprise an input for automatically generating a step (e.g., the next step in an existing sequence of steps on the virtual canvas) or other data object 290 within the integration process 170 being constructed.

Each user request 260 may comprise a natural-language expression that indicates the data object 290 to be generated. A user request 260 may also comprise user-provided data 266, which may be incorporated into data 210 and for which reference vector embeddings may be determined and added to reference vector embeddings 230. User-provided data 266 may comprise data that are specific to user request 260, and which may have been specifically curated by the user. In an embodiment, all of data 210 may be specific to a user request 260, in which case data 210 may consist solely of user-provided data 266. In this case, data store 220 may be dynamically generated for each user request 260, solely from user-provided data 266 that are included in that user request 260. Alternatively, data 210 may consist of only data acquired from data sources other than user request 260, or may comprise both user-provided data 266 and data acquired from data sources other than user request 260.

In subprocess 420 (e.g., implemented by prompt generation module 250), at least one input vector embedding may be determined based on the user request 260 that was received in subprocess 410. The input vector embedding(s) may be determined in subprocess 420 in an identical or similar manner as reference vector embeddings 230 were determined in subprocess 320 (e.g., using the same embedding algorithm). It should be understood that the input vector embedding(s) should be determined for the same vector space as reference vector embeddings 230.

In subprocess 430 (e.g., implemented by prompt generation module 250), one or more semantically similar reference vector embeddings 230 may be identified from data store 220 and/or graph database 240. In particular, as discussed elsewhere herein, the reference vector embeddings 230 in data store 220 and/or graph database 240 may be searched to identify one or more reference vector embeddings 230 that are similar to the input vector embedding(s) based on a similarity metric. It should be understood that this similarity represents a semantic similarity. Reference vector embeddings 230 may represent reference data objects, derived from data 210, which can represent any entity, including, for example, a step in an integration process 170, a data source, a data target, a data schema, a contract between parties, a document, source code (e.g., representing a function definition, software module, software application, script, etc.), a template, an API definition, or the like. Thus, the input vector embedding(s), representing a desired data object, are compared to reference vector embeddings 230, representing known data objects, to identify those known data objects that are semantically similar to the desired data object.

In an embodiment of subprocess 430, a semantic search is firstly performed by searching reference vector embeddings 230 in data store 210 to identify one or more semantically similar reference vector embeddings 230 that are semantically similar to the input vector embedding(s) based on the similarity metric. Then, relationship retrieval is performed by searching graph database 240 to identify one or more related reference vector embeddings 230 that are related to the semantically similar reference vector embedding(s) 230, returned by the semantic search, based on one or more edges within graph database 240. For example, the search of graph database 240 may comprise identifying a first one of the plurality of nodes that includes at least one of the identified semantically similar reference vector embedding(s) 230, identifying at least one second one of the plurality of nodes that is connected to the first node by at least one edge, and returning at least one of the reference vector embeddings 230 in the cluster represented by the second node(s). Each relationship, represented by an edge between a first node and a second node, may be a trait that is shared by the first node and the second node. The shared trait may be a use case, a data vertical, and/or the like.

In an embodiment, when more than a predefined number of nodes are connected to the first node, a plurality of second nodes may be identified by ranking the nodes that are connected to the first node by at least one edge according to one or more factors, and selecting the plurality of second nodes to be the predefined number of the ranked plurality of nodes that are highest ranked. For example, if the predefined number is five and there are ten nodes connected to the first node, those ten nodes may be ranked according to the factor(s), and the top five of those nodes may be selected as the plurality of second nodes to be returned as a result of the relationship retrieval. The factor(s) may comprise a number of edges, a type of relationship (e.g., shared trait, such as use case, data vertical, etc.) represented by the edge(s) connecting the nodes to the first node, a number of each type of relationship represented by the edge(s) connecting the nodes to the first node, and/or the like.

In subprocess 440, a prompt 270 is generated based on the data item(s) associated with the reference vector embedding(s) 230 that were identified in subprocess 430. In particular, the subset of the plurality of data items that are associated with the identified vector embedding(s) 230 may be retrieved from data store 220, for example, using each identified reference vector embedding 230 as an index into data store 220. It should be understood that the identified reference vector embedding(s) 230 may include both any semantically similar reference vector embedding(s) 230 that were identified by the semantic search and any related reference vector embedding(s) 230 that were identified by the relationship retrieval. Prompt 270 may be generated based on the subset of data items that was retrieved. For example, prompt 270 may be generated by retrieving or dynamically generating a template with a pre-conversation and/or post-conversation, and incorporating data from the subset of data item into the template, to produce a prompt 270 that instructs generative language model 280 to generate a data object 290 based on the incorporated data. This incorporated data may comprise raw and/or processed data from the subset of data items and/or from user request 260.

In subprocess 450, the prompt 270 that was generated in subprocess 440 is input to generative language model 280 (e.g., a large language model) to generate data object 290. Prompt 270 may comprise text written in natural language (i.e., with syntax and grammar that would be expected in human speech), to instruct generative language model 280 to generate a data object 290, according to a prescribed format, based on the data incorporated into prompt 270. The prescribed format may be a data structure (e.g., expressed in a hierarchical markup language, such as XML) that can be readily converted into an executable step within an integration process 170. Thus, little to nothing may be required to convert data object 290, as output by generative language model 280, into an actual software module that can be executed or otherwise used as part of an integration process 170 in integration environment 160. The resulting data object 290 may represent any entity, including, for example, a step in an integration process 170, a data source, a data target, a data schema, a contract between parties, a document, source code (e.g., representing a function definition, software module, software application, script, etc.), a template, an API definition, or the like.

In subprocess 460, the data object 290 that was generated by generative language model 280 may be outputted, for example, as a suggestion. As discussed elsewhere herein, data object 290 may comprise a data structure defining one or a plurality of key-value pairs. The data object 290 may be visually represented within graphical user interface 150, such that the user, who submitted user request 260 in subprocess 410, may view data object 290. In particular, a shape may be generated, as an iconic representation of data object 290, and added to other shapes, representing an integration process 170 being constructed on the virtual canvas in graphical user interface 150. Once placed as a shape on the virtual canvas, the user may move, edit, configure, or delete the data object 290 represented by the shape in the same manner as any other shape on the virtual canvas. The visual representation and/or graphical user interface may comprise one or more inputs that enable the user to view, modify (e.g., modify key-value pairs), reconfigure (e.g., modify settings), move, and/or otherwise manipulate data object 290. Once the user has completed construction of the entire integration process 170, the user may save integration process 170 within database 114 and/or deploy integration process 170 for execution within integration environment 160.

In an alternative embodiment, data object 290 may be automatically deployed. In other words, the data object 290 that is generated by generative language model 280 may be automatically saved to database 114 and/or deployed to a production environment (e.g., within integration environment 160) to begin operation, with no user intervention. For example, data object 290 may be incorporated into an integration process 170, and integration process 170 may be deployed to perform data integration in real time within integration environment 160. As used herein, the term "real time" should be understood to include both scenarios in which events occur simultaneously, as well as scenarios in which events are separated in time by ordinary latencies in processing, memory access, communications, and/or the like.

5. Example Operation

An example operation of process 400 will now be described using a concrete example. It should be understood that this is simply one of a virtually infinite number of possible examples, designed to aid in an understanding of embodiments of process 400. In practice, process 400 may be applied to generate any type of data object in any context and for any application whatsoever.

In this example, the following user request 260 is received in subprocess 410:

Create a 'Client' MDH object.

Notably, user request 260 is expressed in natural language and comprises an instruction (i.e., "Create") and indicates a data object (i.e., "a 'Client' MDH object"). In this case, "MDH" refers to a master data hub. A master data hub is a centralized data management system, representing a single source of truth (e.g., a "golden" record) for all essential data entities (e.g., customer information, product details, financial data, etc.), and which stores, manages, and distributes data across multiple systems and applications. Thus, for example, integration processes 170 may feed an organization's data into the master data hub and/or extract the organization's data from the master data hub, as needed for one or more business workflows of the organization. The example user request 260 is requesting the creation of a client MDH object, which is a data object that atomically represents a single client (e.g., customer or account) of the organization.

In subprocess 420, prompt generation module 250 may determine input vector embeddings for the terms "client," "MDH," and/or the like. In other words, prompt generation module 250 may determine the embedding (i.e., semantic location) of each of these term(s) and/or synthetically augmented variations of these term(s) (e.g., synonyms, other related terms, etc.) within the same vector space as reference vector embeddings 230.

In subprocess 430, prompt generation module 250 may perform a semantic search on reference vector embeddings 230 to find one or more vector embeddings 230 that are semantically similar (e.g., closest) to the input vector embedding(s). Continuing the example, this search returns reference vector embeddings 230 for "customer" and "account." Prompt generation module 250 retrieves the data items associated with these returned reference vector embeddings 230, which provides the following data-object definitions for a "Customer" object and an "Account" object:

```
{
    "type": "ObjectType",
    "objectName": "Customer",
    "fields": ["customer_id", "name", "email"],
    "SharedUseCases": ["Client Management", "Sales", "Customer
        Success"],
    "Verticals": ["Retail", "Finance"]
},
{
    "type": "ObjectType",
    "objectName": "Account",
    "fields": ["account_number", "account_type", "balance"],
    "SharedUseCases": ["Sales", "Customer Success", "Billing"],
    "Verticals": ["Banking", "Finance"]
}
```

In an embodiment of data model 200 that comprises graph database 240, prompt generation module 250 may also perform relationship retrieval by searching graph database 240 in subprocess 430. In particular, prompt generation module 250 may search the nodes of graph database 240 to identify those node(s) that comprise the reference vector embeddings 230 of "customer" and "account." Then, prompt generation module 250 may search the edges, irradiating from those identified node(s), to identify other nodes that are related by shared traits, such as use case, data vertical, and/or the like. Prompt generation module 250 may determine that another node is a match if it satisfies one or more criteria (e.g., one or more shared traits). Continuing the example, the search returns reference vector embeddings 230 for "contact" and "lead." Prompt generation module 250 retrieves the data items associated with these returned reference vector embeddings 230, which provides the following additional data-object definitions for a "Contact" object and a "Lead" object:

```
{
  "type": "ObjectType",
  "objectName": "Lead",
  "fields": ["id", "campaign", "company", "industry", "owner"],
  "SharedUseCases": ["Client Management", "Lead Generation",
      "Customer Success"],
  "Verticals": ["Marketing", "Retail"]
},
{
  "type": "ObjectType",
  "objectName": "Contact",
  "fields": ["contact_id", "name", "phone"],
  "SharedUseCases": ["Client Management", "Lead Generation",
      "Marketing"],
  "Verticals": ["Marketing", "Sales"]
}
```

Notably, the "Contact" object has a shared use case of "Client Management" with the "Customer" object, whereas the "Lead" object has a shared use case of "Client Management" with the "Customer" object, a shared use case of "Customer Success" with each of the "Customer" and "Account" objects, and a shared data vertical of "Retail" with the "Customer" object. Since the "Lead" object has a stronger connection (i.e., more shared traits) to the data objects found in the semantic search, it may be ranked higher than the "Contact" object in the search results returned by graph database 240.

In subprocess 440, prompt generation module 250 generates prompt 270 based on the data-object definitions returned in the search in subprocess 430. Continuing the example, the following prompt 270, which includes both a pre-conversation at the start and a post-conversation at the end, is generated:

Please generate a new data object definition for 'Client' to be used in an integration flow. The object should contain fields relevant to representing a client entity. As context, the following related data objects have already been defined:

```
{
  "type": "ObjectType",
  "objectName": "Customer",
  "fields": ["customer_id", "name", "email"],
  "SharedUseCases": ["Client Management", "Sales", "Customer
      Success"],
  "Verticals": ["Retail", "Finance"]
},
{
  "type": "ObjectType",
  "objectName": "Account",
  "fields": ["account_number", "account_type", "balance"],
  "SharedUseCases": ["Sales", "Customer Success", "Billing"],
  "Verticals": ["Banking", "Finance"]
},
{
  "type": "ObjectType",
  "objectName": "Lead",
  "fields": ["id", "campaign", "company", "industry", "owner"],
  "SharedUseCases": ["Client Management", "Lead Generation",
      "Customer Success"],
  "Verticals": ["Marketing", "Retail"]
},
{
  "type": "ObjectType",
  "objectName": "Contact",
  "fields": ["contact_id", "name", "phone"],
  "SharedUseCases": ["Client Management", "Lead Generation",
      "Marketing"],
  "Verticals": ["Marketing", "Sales"]
}
```

Could you please generate the object name 'Client' and its list of fields using the same format as the above context objects. The final object definition should be logically consistent and useful for integrating client data.

In subprocess 450, prompt 270 is input to generative language model 280. Continuing the example, generative language model 280 produces the following data object 290 as an output:

```
{
  "type": "ObjectType",
  "objectName": "Client",
  "fields": ["client_id", "name", "address", "phone",
      "email", "industry", "account_number",
      "primary_contact"]
}
```

Notably, the resulting definition of data object 290 includes the same primary keys as the data-object definitions included in prompt 270, including "type", "objectName", and "fields". In addition, the list value of "fields" includes a unique identifier "client_id", as in the other data-object definitions, as well as some existing fields from the other data-object definitions (e.g., "name", "phone", "email", "industry", and "account_number"), and some new fields (e.g., "address" and "primary_contact").

In subprocess 460, data object 290 is output. For example, the data definition of data object 290 above may be incorporated into a new client MDH object that can be used as a target object for client data that is being incorporated into the master data hub of an organization. Clients from a plurality of different third-party applications (e.g., within integration environment 160 and/or on target system(s) 140) may feed client data into instances of the new client MDH object and/or extract client data from instances of the new client MDH object. Thus, for example, a client from Google™ Contacts, NetSuite™ Contacts, Saleforce™ Contacts, Google™ Spreadsheet, and/or the like can be fed into a client MDH object, which acts as a golden record in the master data hub for that contact. Conversely, the client may be output from the client MDH object, as the golden record for a contact, into any of these third-party applications, to thereby provide a single centralized source of truth for the contact.

6. Example Graphical User Interface

Figure 5:
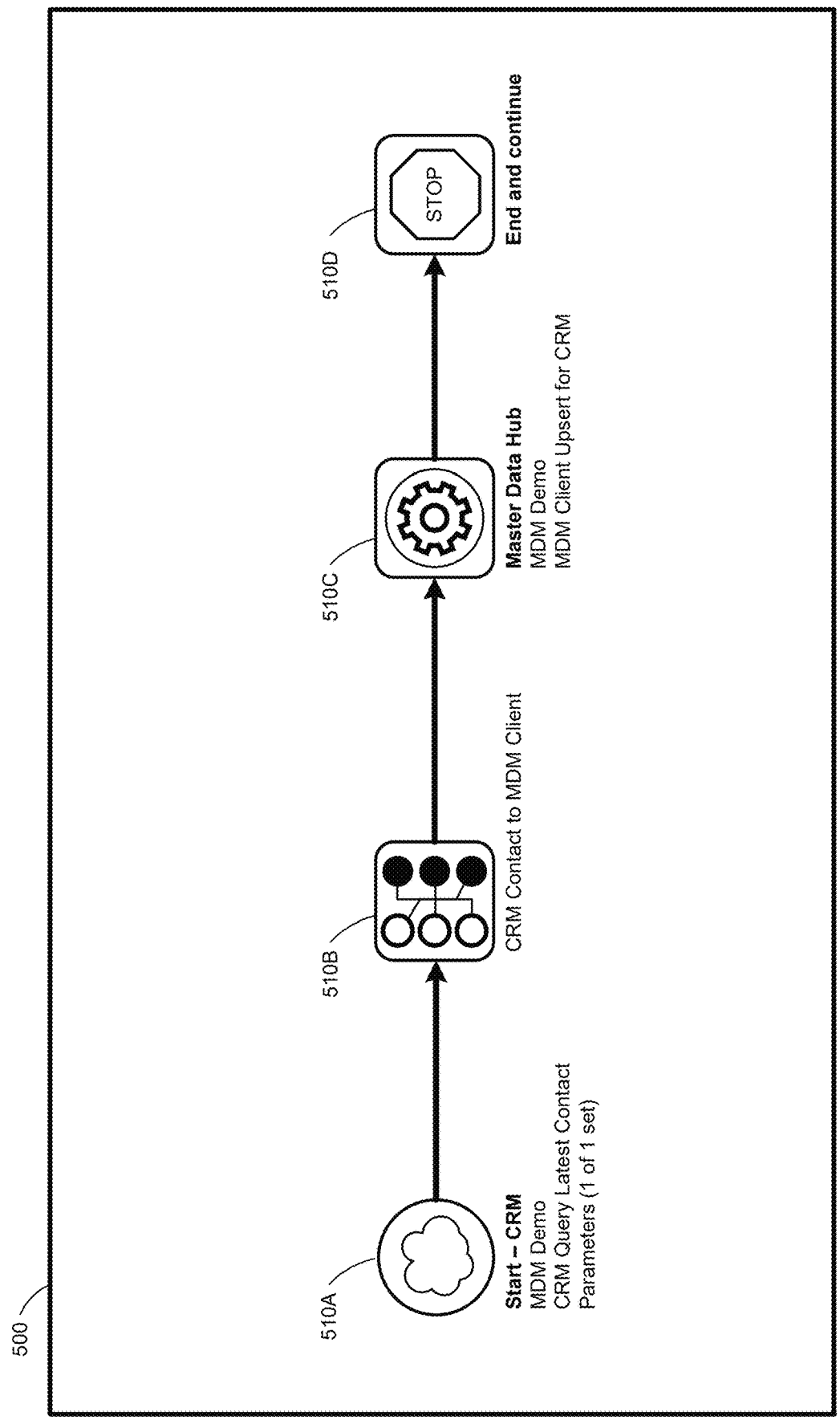
FIG. 5 illustrates an example screen of a graphical user interface for displaying an automatically generated data object within a virtual canvas, according to an embodiment.

FIG. 5 illustrates an example virtual canvas 500 of graphical user interface 150 for constructing an integration process 170, according to an embodiment. It should be understood that virtual canvas 500 represents one example of the visual representation of data object 290 in subprocess 460 of process 400. This example continues the example operation of process 400, described above.

As illustrated, once data object 290 has been generated, a shape 510 for data object 290 may be added to virtual canvas 500. In particular, shape 510C is a visual representation of the client MDH object that was automatically generated as data object 290 in the above example. It should be understood that each of the other shapes 510A, 510B, and/or 510D represent data objects that could have been automatically generated as data objects 290 via process 400 or manually generated via one or more inputs (not shown) of virtual canvas 500. In this example, shapes 510 represent an integration process 170 that, as represented by shape 510A, queries the latest contact from a CRM system (e.g., third-party system 140), then as represented by shape 510B, maps the data from the queried contact to a Master Data Management (MDM) client, then as represented by shape 510C, upserts the data of the MDM contact into an instance of the client MDH object within a master data hub, and finally ends, as represented by shape 510D. In other words, this integration process 170 upserts contacts from a CRM system into client MDH objects in the master data hub for an organization.

Although not specifically illustrated, screen 500 may comprise one or more inputs that enable the user to modify each data object 290. For example, each shape 510 may be selectable. In response to the selection of a shape 510, graphical user interface may display a dialog which enables a user to view and/or modify one or more parameters (e.g., the value of one or more key-value pairs) of the data object 290 represented by the selected shape 510. Graphical user interface 150 may also comprise one or more inputs for adding new shapes 510 to the virtual canvas (e.g., including automatically generating new data objects 290), deleting shapes 510 from the virtual canvas, dragging and dropping shapes 510 to new positions on virtual canvas, saving, testing, and/or deploying the integration process 170 represented on the virtual canvas, and/or the like.

7. Example Application

Disclosed embodiments enable a developer or other user on platform 110 (e.g., for managing an integration platform on an iPaaS platform) to easily generate data objects 290 using semantic comparisons and artificial intelligence. The developer simply needs to request the object in natural language, and process 400 will automatically generate a data object 290 according to the user request 260. The developer no longer needs to manually define the data object or rely on static data objects, thereby removing the onus of understanding what is required to construct a data object from the developer.

Once generated, a data object 290 may be incorporated into any number of integration processes 170 within an integration platform. In particular, data object 290 may be stored (e.g., by software 112 in database 114) as a retrievable data structure that can be incorporated into any integration process 170. For example, data object 290 may be available as a shape, on a virtual canvas 500 of graphical user interface 150, that can be dragged and dropped into an appropriate position within any integration process 170 being constructed on virtual canvas 500. This enables data object 290 to be used and reused in a simple, repeatable, and extensible manner, in any one or more integration processes 170.

If data object 290 implements a step in an integration process 170, data object 290 may be executed, as part of the integration process 170 within the runtime engine of integration environment 160, to process data in real time. As an example, the runtime engine may be a Boomi Atom™, which is coded in Java, so as to run in a Java Virtual Machine (JVM). However, it should be understood that the integration process 170 may be executed in other runtime engines, potentially coded in other programming languages.

Embodiments have primarily been described herein as generating data objects 290 for integration processes 170. However, it should be understood that the disclosed embodiments may be used to generate data objects 290 for any process in any application. Accordingly, processes 300 and 400 are not limited to an integration platform or any particular context. More generally, a data object 290 may be automatically generated, according to disclosed embodiments, and deployed for any purpose whatsoever.

As described herein, embodiments of data model 200 may include one or more, and preferably all, of the following broad categories of functionality:

(1) Semantic Search. In particular, one or more input vector embeddings are determined from user request 260. The input vector embedding(s), which represent the user's objective, are then used to search reference vector embeddings 230 for semantically similar reference data objects and/or other data items.

(2) Relationship Retrieval. In particular, a graph database 240, which links reference vector embeddings 230 in a graph comprising nodes and edges, is searched for related nodes. For example, nodes, which share one or more edge relationships with the node(s) comprising the reference vector embeddings 230 returned by the semantic search, may be returned. In an embodiment, the query of graph database 240 prioritizes the data items (e.g., reference data objects) with the highest number of relationships (i.e., edges). For example, a data item that has two shared data verticals and one shared use case may be returned with a higher ranking than a data item that has only a single shared use case. The number of data items that are returned may be limited to a predefined number of the highest-ranked data items, which may improve the signal-to-noise ratio in the generation of data object 290 by generative language model 280. In an embodiment, the returned data items are reference data objects that are appended to the reference data objects returned in the semantic search.

(3) Prompt Generation. In particular, a variation of a retrieval-augmented-generation design is used to generate a prompt 270, which instructs generative language model 280 to generate a data object 290 based on user request 260 and the data items (e.g., reference data objects) retrieved by the semantic search and/or relationship retrieval. In an embodiment, prompt 270 may comprise all or a subset of the reference data objects that were returned by the semantic search and the relationship retrieval. Prompt 270 may also include additional context to inform generative language model 280 about the appropriate structure (e.g., XML or other markup language) of data object 290. Essentially, prompt 270 may be designed to prime generative language model 280 with both canonical parameters attached to reference data objects and definition-level context describing the structure of the data object 290 that needs to be generated.

(4) Data Object Generation. In particular, prompt 270 is input to generative language model 280, which outputs data object 290. Data object 290 may be provided to a user as a suggestion, which can be reviewed and/or modified, and then created upon approval by the user. Alternatively, data object 290 may be created automatically (i.e., without user confirmation or other intervention). However, even in this case, the user may be free to modify data object 290, as needed, after creation (e.g., via graphical user interface 150). In either case, the user can check data object 290, correct parameters of data object 290, provide feedback to the system for automated adjustments to data object 290, and/or the like.

For the purposes of illustration, one example application of the disclosed embodiments will be described. The example application is master system synchronization. In this case, data object 290 represents a data structure for a record in a master data hub. Master system synchronization is an integration that involves synchronizing or updating master data across various semantically related systems or source applications. In this example, the master data are contact data. The semantic search will retrieve inter-related data objects belonging to the source applications by finding semantically similar reference vector embeddings 230. In addition, the relationship retrieval will determine the applications and connectors that belong to similar classes and domains, and how they are inter-related using edge relationships in graph database 240. Disclosed embodiments are able to generate data object 290 in each of these possible scenarios:

(1) No Source and No Target. Data model 200 is able to generate a data object 290 even when no data source or data target is provided in user request 260. For example, as described in the example above, despite user request 260 providing no source and no target, data model 200 was able to build a unified contact management object (e.g., for Google™ contacts, NetSuite™ contacts, Salesforce™ contacts, etc.) that ensures a single view for an organization's contacts, which are otherwise residing in silos in disparate systems that each represents its own business operation. As exemplified herein, data model 200 may do this by identifying all of the semantically similar reference data objects across all systems and applications (e.g., via semantic search of vector embeddings 230 and relationship retrieval from graph database 240), and generating a client MDH object that encompasses all of them (e.g., using prompt 270 with generative language model 280). With the unified contact management provided through the client MDH object, individual integration processes 170 can be constructed to synchronize the contacts from all of these disparate systems into a unified MDH model, represented by the client MDH object.

(2) Target and No Source. Data model 200 is able to generate a data object 290 when only the target MDH profile is provided in user request 260. In this case, data model 200 may identify all of the semantically similar reference data objects across all systems and applications, and bundle them together to produce a common source profile, as data object 290, that maps source data to the target MDH profile.

(3) Source and No Target. Data model 200 is able to generate a data object 290 when only the source profile and context around the use case are provided in user request 260. In this case, data model 200 may identify all of the semantically similar reference data objects that are relevant to the context, and generate a target MDH profile, as data object 290. For example, given data representing entities of a retail organization (e.g., product, category, brand, supplier, etc.), data model 200 may infer semantic relationships between these entities and create a target MDH profile based on the provided use case.

While embodiments have been described primarily with reference to clients for master data management, it should be understood that the disclosed embodiments may generate data objects 290 representing any type of data in any context and for any application. As another example, user request 260 may request data model 200 to create a contract for a specific application programming interface (e.g., Salesforce™ and NetSuite™). An API contract is a formal agreement that outlines how different software or services should interact with each other (e.g., by defining rules, specifications, and expectations of data exchange). In this case, prompt generation module 250 may perform a semantic search of vector embeddings 230 to identify the most similar data items in data store 220, which may include existing Salesforce™ API definitions. Then, prompt generation module 250 may use edge relationships from nodes in graph database 240, representing the identified data items, to find related data items in data store 220. These related data items may include general CRM, ERP, order-to-cash contracts, and/or the like. Finally, prompt generation module 250 may generate a prompt 270, based on the semantically similar and related data items, and input prompt 270 to generative language model 280 to produce a new API contract as data object 290, which a user may review and modify as needed. It should be understood that there are practically infinite other scenarios in which data model 200 may be used to automatically generate data objects 290 based on anywhere from very simple to very complex user requests 260.

8. Example Processing System

Figure 6:
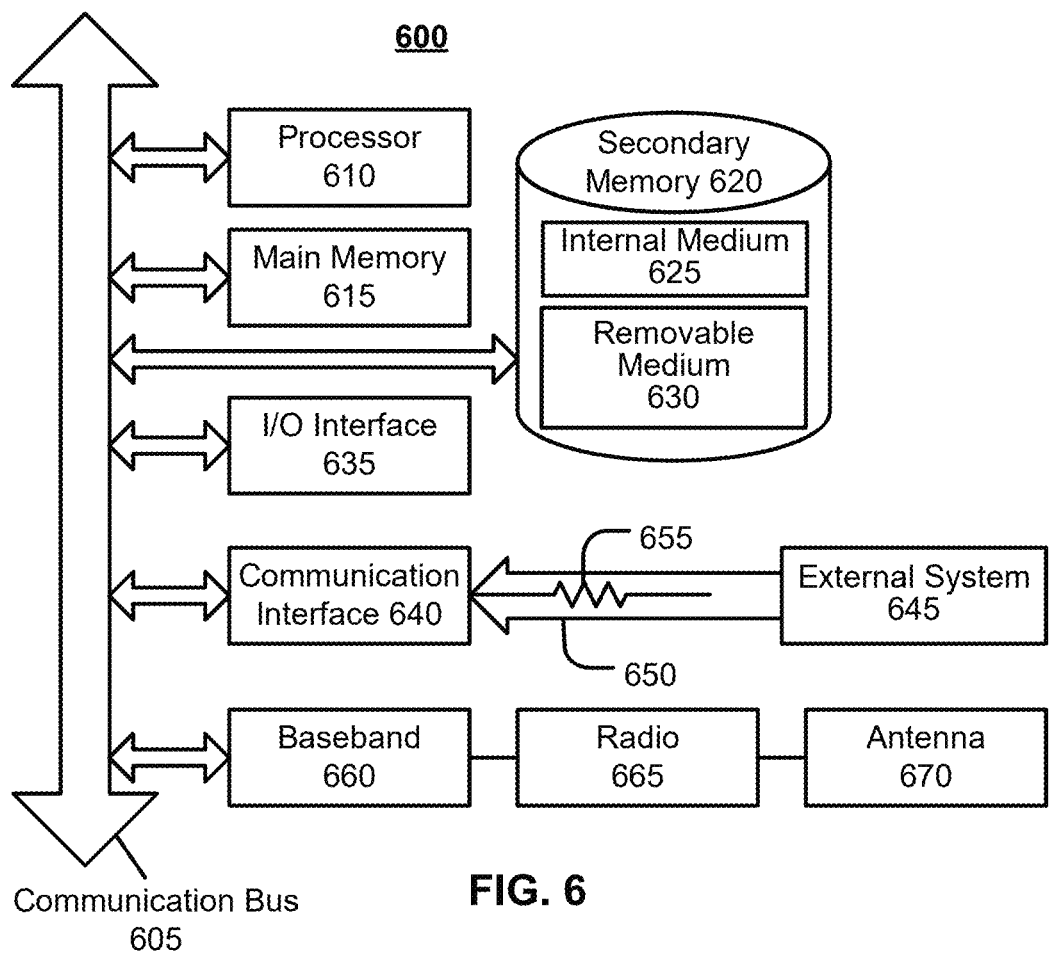
FIG. 6 illustrates an example processing system, by which one or more of the processes described herein may be executed, according to an embodiment.

FIG. 6 illustrates an example processing system, by which one or more of the processes described herein may be executed, according to an embodiment. For example, system 600 may be used to store and/or execute software (e.g., software 112, database 114, etc.) that implements data model 200, process 300, and/or process 400, and/or may represent components of platform 110, user system(s) 130, third-party system(s) 140, and/or other processing devices described herein. System 600 can be any processor-enabled device (e.g., server, personal computer, etc.) that is capable of wired or wireless data communication. Other processing systems and/or architectures may also be used, as will be clear to those skilled in the art.

System 600 may comprise one or more processors 610. Processor(s) 610 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 610. Examples of processors which may be used with system 600 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 610 may be connected to a communication bus 605. Communication bus 605 may include a data channel for facilitating information transfer between storage and other peripheral components of system 600. Furthermore, communication bus 605 may provide a set of signals used for communication with processor 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 600 may comprise main memory 615. Main memory 615 provides storage of instructions and data for programs executing on processor 610, such as any of the software discussed herein. It should be understood that programs stored in the memory and executed by processor 610 may be written and/or compiled according to any suitable language, including without limitation C/C++, Java, JavaScript, Perl, Python, Visual Basic, .NET, and the like.

Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 600 may comprise secondary memory 620. Secondary memory 620 is a non-transitory computer-readable medium having computer-executable code and/or other data (e.g., any of the software disclosed herein, including software 112) stored thereon. In this description, the term "computer-readable medium" is used to refer to any non-transitory computer-readable storage media used to provide computer-executable code and/or other data to or within system 600. The computer software stored on secondary memory 620 is read into main memory 615 for execution by processor 610. Secondary memory 620 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 620 may include an internal medium 625 and/or a removable medium 630. Internal medium 625 and removable medium 630 are read from and/or written to in any well-known manner. Internal medium 625 may comprise one or more hard disk drives, solid state drives, and/or the like. Removable storage medium 630 may be, for example, a magnetic tape drive, a compact disc (CD) drive, a digital versatile disc (DVD) drive, other optical drive, a flash memory drive, and/or the like.

System 600 may comprise an input/output (I/O) interface 635. I/O interface 635 provides an interface between one or more components of system 600 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 600 may comprise a communication interface 640. Communication interface 640 allows software to be transferred between system 600 and external devices, networks, or other information sources. For example, computer-executable code and/or data may be transferred to system 600 from a network server via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 600 with a network (e.g., network(s) 120) or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 640 is generally in the form of electrical communication signals 655. These signals 655 may be provided to communication interface 640 via a communication channel 650 between communication interface 640 and an external system 645. In an embodiment, communication channel 650 may be a wired or wireless network (e.g., network(s) 120), or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 615 and/or secondary memory 620. Computer-executable code can also be received from an external system 645 via communication interface 640 and stored in main memory 615 and/or secondary memory 620. Such computer-executable code, when executed, enables system 600 to perform the various functions of the disclosed embodiments as described elsewhere herein.

In an embodiment that is implemented using software, the software may be stored on a computer-readable medium and initially loaded into system 600 by way of removable medium 630, I/O interface 635, or communication interface 640. In such an embodiment, the software is loaded into system 600 in the form of electrical communication signals 655. The software, when executed by processor 610, preferably causes processor 610 to perform one or more of the processes described elsewhere herein.

System 600 may optionally comprise wireless communication components that facilitate wireless communication over a voice network and/or a data network (e.g., in the case of user system 130). The wireless communication components comprise an antenna system 670, a radio system 665, and a baseband system 660. In system 600, radio frequency (RF) signals are transmitted and received over the air by antenna system 670 under the management of radio system 665.

In an embodiment, antenna system 670 may comprise one or more antennae and one or more multiplexors (not shown) that perform a switching function to provide antenna system 670 with transmit and receive signal paths. In the receive path, received RF signals can be coupled from a multiplexor to a low noise amplifier (not shown) that amplifies the received RF signal and sends the amplified signal to radio system 665.

In an alternative embodiment, radio system 665 may comprise one or more radios that are configured to communicate over various frequencies. In an embodiment, radio system 665 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 665 to baseband system 660.

If the received signal contains audio information, then baseband system 660 decodes the signal and converts it to an analog signal. Then the signal is amplified and sent to a speaker. Baseband system 660 also receives analog audio signals from a microphone. These analog audio signals are converted to digital signals and encoded by baseband system 660. Baseband system 660 also encodes the digital signals for transmission and generates a baseband transmit audio signal that is routed to the modulator portion of radio system 665. The modulator mixes the baseband transmit audio signal with an RF carrier signal, generating an RF transmit signal that is routed to antenna system 670 and may pass through a power amplifier (not shown). The power amplifier amplifies the RF transmit signal and routes it to antenna system 670, where the signal is switched to the antenna port for transmission.

Baseband system 660 is communicatively coupled with processor(s) 610, which have access to memory 615 and 620. Thus, software can be received from baseband processor 660 and stored in main memory 610 or in secondary memory 620, or executed upon receipt. Such software, when executed, can enable system 600 to perform one or more of the processes described elsewhere herein.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   for each of a plurality of data items, determine a reference vector embedding for the data item that defines a semantic location of the data item within a vector space, wherein the vector space has a plurality of dimensions, and store the data item in association with the reference vector embedding within a data store;
   generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes; and
   for each of one or more user requests for a data object,
      determine at least one input vector embedding, within the vector space, based on the user request,
      search the reference vector embeddings in the data store to identify one or more semantically similar reference vector embeddings that are semantically similar to the at least one input vector embedding based on a similarity metric,
      search the graph database to identify one or more related reference vector embeddings that are related to the identified one or more semantically similar reference vector embeddings based on one or more edges within the graph database,
      retrieve at least a subset of the plurality of data items associated with the identified one or more semantically similar reference vector embeddings and the identified one or more related reference vector embeddings,
      generate a prompt based on the at least a subset of data items,
      input the prompt to a generative language model to generate the data object, and
      output the data object.

2. The method of claim 1, wherein the generative language module is a large language model.

3. The method of claim 1, wherein at least one of the one or more user requests identifies the data object to be generated.

4. The method of claim 3, wherein the at least one user request includes a context of the data object.

5. The method of claim 1, wherein the plurality of data items comprises a plurality of reference data objects.

6. The method of claim 1, wherein searching the graph database comprises:
   identifying a first one of the plurality of nodes that includes at least one of the identified one or more semantically similar reference vector embeddings;
   identifying at least one second one of the plurality of nodes that is connected to the first node by at least one edge; and
   including at least one of the reference vector embeddings, in the cluster represented by the at least one second node, in the identified one or more related reference vector embeddings.

7. The method of claim 6, wherein the relationship, represented by the at least one edge, is a trait that is shared by the first node and the at least one second node.

8. The method of claim 6, wherein the trait is a use case.

9. The method of claim 6, wherein the trait is a data vertical.

10. The method of claim 6, wherein the at least one second node is a plurality of second nodes, and wherein identifying at least one second one of the plurality of nodes that is connected to the first node by at least one edge comprises, when more than a predefined number of the plurality of nodes are connected to the first node by at least one edge:

ranking the plurality of nodes that are connected to the first node by at least one edge, according to one or more factors; and selecting the plurality of second nodes to be the predefined number of the ranked plurality of nodes that are highest ranked.

11. The method of claim 10, wherein the one or more factors comprise a number of edges.

12. The method of claim 10, wherein the one or more factors comprise a type of relationship represented by the at least one edge connecting the ranked plurality of nodes to the first node.

13. The method of claim 10, wherein the one or more factors comprise a number of edges, and a type of relationship represented by the at least one edge connecting the ranked plurality of nodes to the first node.

14. The method of claim 10, wherein the one or more factors comprise a number of each type of relationship represented by the at least one edge connecting the ranked plurality of nodes to the first node.

15. The method of claim 1, wherein the data object represents a data structure for a record in a master data hub.

16. The method of claim 1, wherein outputting the data object comprises displaying a visual representation of the data object on a virtual canvas within a graphical user interface.

17. The method of claim 1, further comprising using the at least one hardware processor to, for each of the one or more user requests, incorporate the data object into an integration process.

18. The method of claim 17, further comprising using the at least one hardware processor to, for each of the one or more user requests, deploy the integration process to perform data integration in real time within an integration environment.

19. A system comprising:
at least one hardware processor; and
software that is configured to, when executed by the at least one hardware processor,
for each of a plurality of data items, determine a reference vector embedding for the data item that defines a semantic location of the data item within a vector space, wherein the vector space has a plurality of dimensions, and store the data item in association with the reference vector embedding within a data store,
generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes, and
for each of one or more user requests for a data object,
determine at least one input vector embedding, within the vector space, based on the user request,
search the reference vector embeddings in the data store to identify one or more semantically similar reference vector embeddings that are semantically similar to the at least one input vector embedding based on a similarity metric,
search the graph database to identify one or more related reference vector embeddings that are related to the identified one or more semantically similar reference vector embeddings based on one or more edges within the graph database,
retrieve at least a subset of the plurality of data items associated with the identified one or more semantically similar reference vector embeddings and the identified one or more related reference vector embeddings,
generate a prompt based on the at least a subset of data items,
input the prompt to a generative language model to generate the data object, and
output the data object.

20. A non-transitory computer-readable medium having instructions stored therein, wherein the instructions, when executed by a processor, cause the processor to:
for each of a plurality of data items, determine a reference vector embedding for the data item that defines a semantic location of the data item within a vector space, wherein the vector space has a plurality of dimensions, and store the data item in association with the reference vector embedding within a data store;
generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes; and
for each of one or more user requests for a data object,
determine at least one input vector embedding, within the vector space, based on the user request,
search the reference vector embeddings in the data store to identify one or more semantically similar reference vector embeddings that are semantically similar to the at least one input vector embedding based on a similarity metric,
search the graph database to identify one or more related reference vector embeddings that are related to the identified one or more semantically similar reference vector embeddings based on one or more edges within the graph database,
retrieve at least a subset of the plurality of data items associated with the identified one or more semantically similar reference vector embeddings and the identified one or more related reference vector embeddings,
generate a prompt based on the at least a subset of data items,
input the prompt to a generative language model to generate the data object, and
output the data object.

* * * * *